United States Patent [19]

Lubberink

[11] Patent Number: 5,279,253
[45] Date of Patent: Jan. 18, 1994

[54] DEVICE FOR FITTING OR REMOVING A CLUSTER OF TEAT CUPS FOR ANIMALS

[75] Inventor: Jan Lubberink, Havelte, Netherlands

[73] Assignee: Gascoigne-Melotte B.V., Emmeloord, Netherlands

[21] Appl. No.: 901,393

[22] Filed: Jun. 19, 1992

[30] Foreign Application Priority Data

Jun. 2, 1991 [NL] Netherlands ............... 9101064

[51] Int. Cl.⁵ ............................................. A01J 7/00
[52] U.S. Cl. .............................. 119/14.08; 119/14.1
[58] Field of Search ............... 119/14.01, 14.03, 14.08, 119/14.1, 14.11, 14.12

[56] References Cited

U.S. PATENT DOCUMENTS

| | | | |
|---|---|---|---|
| 4,805,557 | 2/1989 | Van der Lely et al. | 119/14.08 |
| 4,805,559 | 2/1989 | Van der Lely et al. | 119/14.1 |
| 4,936,256 | 6/1990 | Pera | 119/14.08 |
| 5,069,160 | 12/1991 | Street et al. | 119/14.08 |

FOREIGN PATENT DOCUMENTS

| | | |
|---|---|---|
| 0167555 | 1/1986 | European Pat. Off. |
| 0209202 | 1/1987 | European Pat. Off. |
| 0213660 | 3/1987 | European Pat. Off. |
| 0306579 | 3/1989 | European Pat. Off. |
| 2218888 | 11/1989 | United Kingdom |

Primary Examiner—John G. Weiss
Attorney, Agent, or Firm—Buchanan Ingersoll

[57] ABSTRACT

Device for fitting a cluster of teat cups 3 on animals, comprising a corresponding set of bearing arms 1 in which each teat cups 3 is situated at the end of its own bearing arm 1, which bearing arms are each rotatable around a transfer-running rotary shaft 20, and are each suitable for varying the distance between the teat cup 3 in question and the rotary shaft 20, and also driving means for moving each bearing arm in such a way that the corresponding teat cup 3 can be fitted on a teat, wherein each bearing arm is essentially horizontal and can be slit parallel to each rotarty shaft. The rotary shaft 20 of the bearing arms can be suspended from a common telescopic supporting structure 12, 13 for inserting or removing the teat cups at the rear side of the animal to be milked between its hind legs.

23 Claims, 4 Drawing Sheets

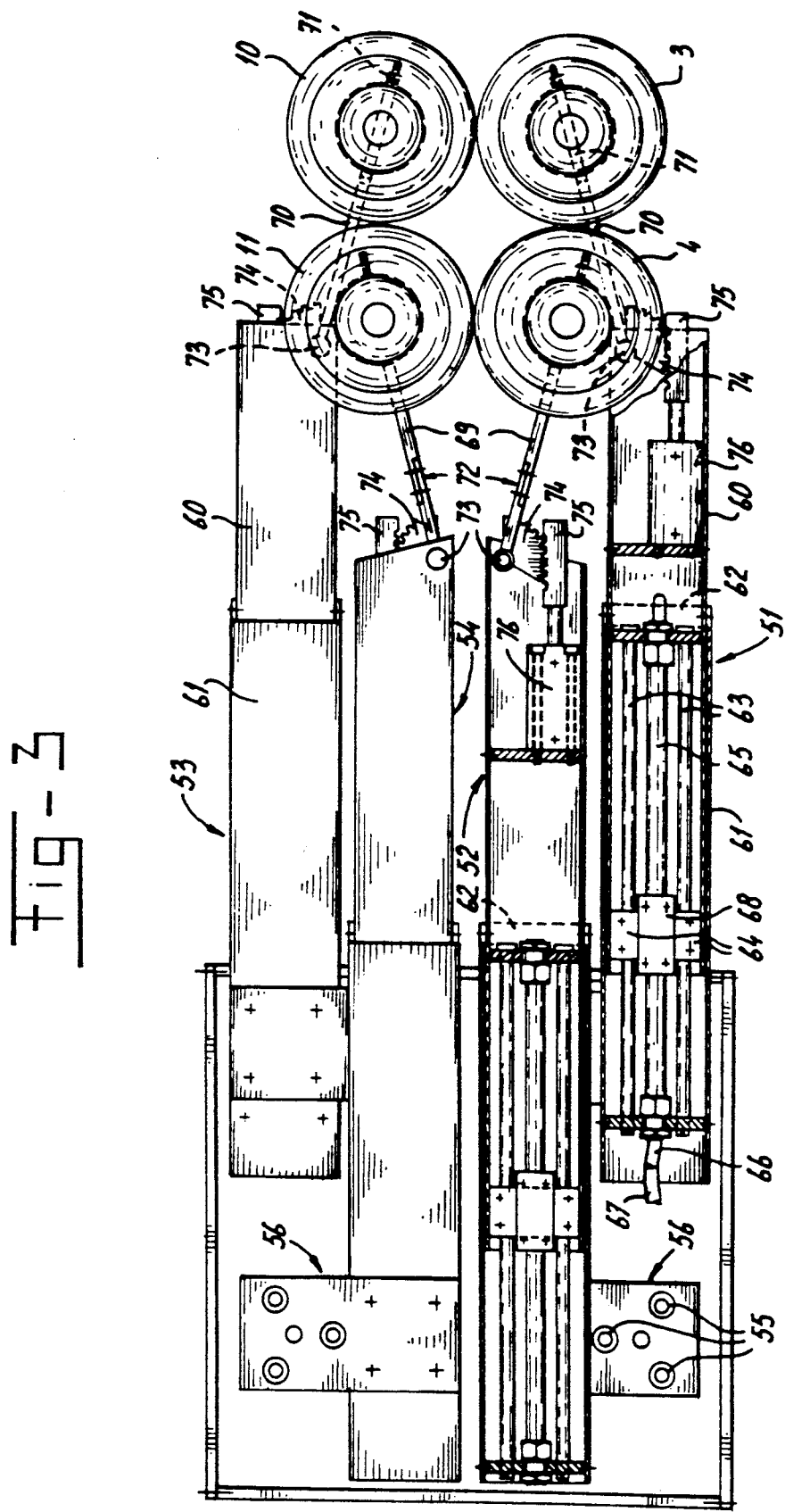

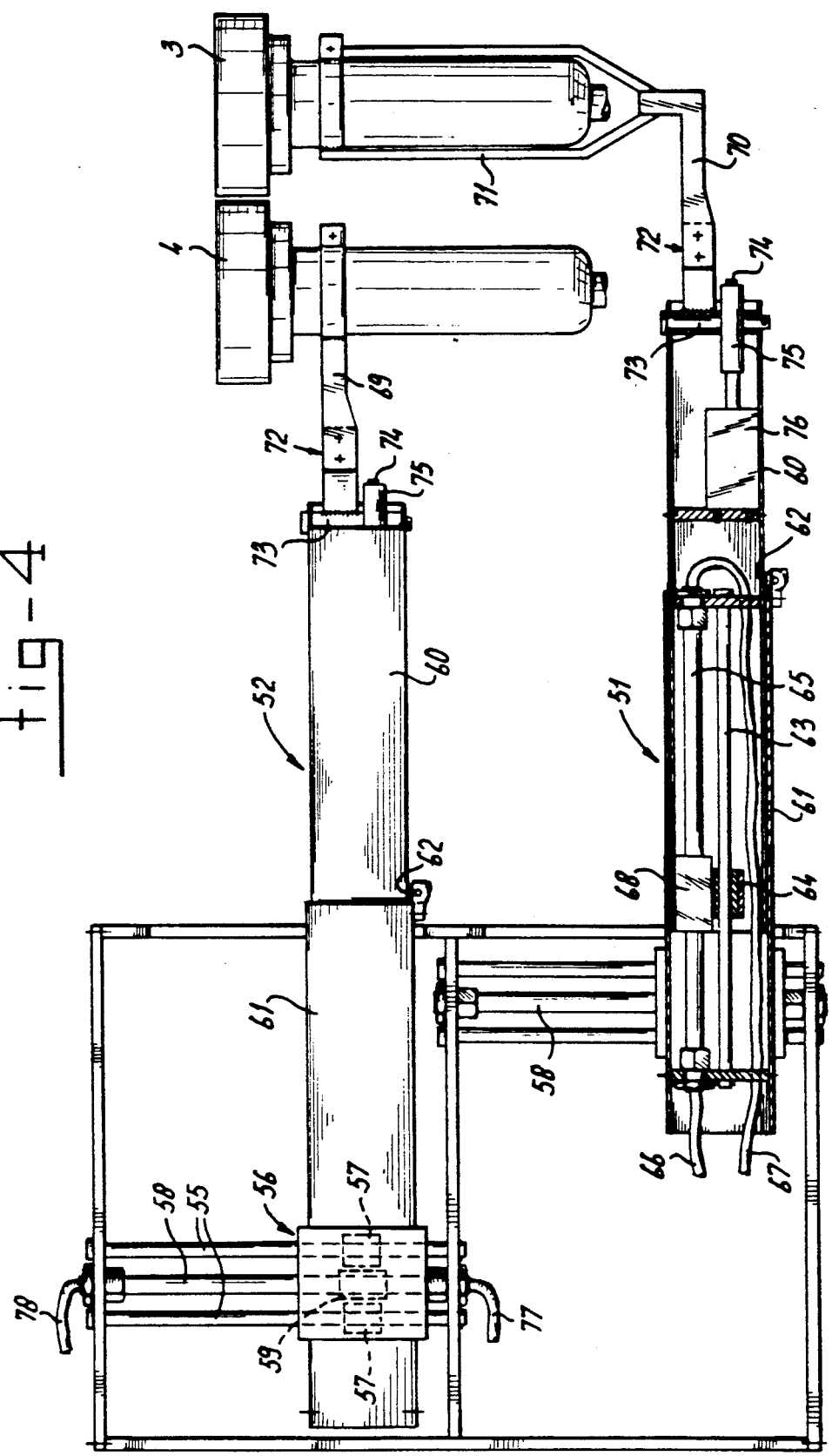

DEVICE FOR FITTING OR REMOVING A CLUSTER OF TEAT CUPS FOR ANIMALS

BACKGROUND OF THE INVENTION

The invention relates to a device for fitting a cluster of teat cups on animals, comprising a corresponding set of bearing arms, in which each teat cup is situated at the end of its own essentially horizontal bearing arm, which bearing arms are suspended from a supporting structure, by means of which the bearing arms and the teat cups can be placed or removed from between the hind legs of the animal to be milked, and also drive means for moving each bearing arm in such a way that the corresponding teat cup can be fitted on a teat.

Such a device is known from European Patent Application EP-A-209202. In the case of this known device the bearing arms are suspended from a supporting structure which extends between the hind legs of the animal to be milked. By means of this supporting structure, the bearing arms, and thus the teat cups, are moved up and down together when the teat cups are being placed on or removed from the teats.

The disadvantages of this known device is that all four teat cups always have to be fitted or removed at the same time. If, for example, the fitting of a single teat cup goes wrong, it is not possible to repeat the fitting procedure for that one teat cup, but the whole teat cup cluster with all four teat cups, thus including those which were fitted properly, has to be removed.

SUMMARY OF THE INVENTION

The object of the invention is therefore to provide a device of the abovementioned type which does not have these disadvantages. This is achieved through each bearing arm being movable vertically relative to the supporting structure independently of the other bearing arms. Since the bearing arms can each carry out the movements necessary for fitting the teat cup in question independently of each other, it is no longer necessary to remove the already correctly fitted teat cups again if one of the teat cups is not properly fitted. The fitting of the complete teat cup cluster can consequently be achieved more quickly and with fewer moving operations, which is less disturbing for the animal to be milked.

A further disadvantage of the known device is that all moving parts of the bearing arms with their drive mechanisms are under the cow. This makes them exposed to heavy soiling, which does not improve the reliability of the device.

In this respect also, the device according to the invention can offer an improvement if the bearing arms all extend essentially in the same direction from the supporting structure, and the arms are of such length that in the position in which the teat cups are fitted on the teats the supporting structure lies fully or almost fully behind the hind legs of the animal.

Each bearing arm is preferably slidable along an essentially vertical guide.

According to a preferred embodiment, these guides of every two bearing arms lie in line with each other, in particular the guides of each pair of bearing arms with teat cups intended for fitting on the left or right teats of the animal. The overall width of the device can thus remain limited, which facilitates insertion of the teat cups between the hind legs. In this case the teat cups can also be brought into a position as close together as possible before the whole unit is inserted between the hind legs. This also has constructional advantages, as regards simplicity and the parts being identical to each other.

A further reduction of the overall width can be obtained if the bearing arm of each pair with the teat cup intended for the front teat of the animal is situated at a lower level than the other bearing arm of that particular pair. In this case an upright support can be provided at the end of each lower down bearing arm facing away from the guide, in order to support the corresponding teat cup at essentially the level of the other arm of the pair in question, in such a way that all teat cups of the device are still situated at the same nominal level.

Each supporting arm can have a slide piece which is slidable in the lengthwise direction along the guide in question, and is non-rotatable relative to said guide. The sliding in the vertical direction is ensured through the fact that each guide bears a transverse support to which the housing or the piston rod of a piston-cylinder unit is fixed, and the piston rod or the housing is fixed to the slide piece.

The positioning of the teat cups in the crosswise direction relative to the animal to be milked can be achieved in various ways. According to a first possible embodiment of the device, the guides are made in the form of a vertical rotary shaft. When the rotary shaft is turned, the bearing arm swings in the crosswise direction in such a way that the desired transverse position of the teat cups can be set. A rotary drive is preferably connected in each case to the bottom end of each rotary shaft of a bearing arm as a lower level, and to the top end of each bearing arm at a higher level.

According to a second possible embodiment of the device, the guides are fixed, and each bearing arm has at its end facing away from the supporting structure an auxiliary arm which at one side is fixed to said bearing arm so that it pivots about an essentially vertical axis, and which at the other side bears a teat cup. The desired transverse position of the teat cup can be set on turning of the auxiliary arm.

The shaft preferably has attached to it the cogged quadrant which meshes with a rack which is slidable in the lengthwise direction of the arm, which rack is drivable by means of a linear motor fixed to the arm.

For the purpose of positioning the test cups in the lengthwise direction of the animal to be milked, the bearing arms are telescopic, and the telescopic parts are displaceable relative to each other by means of a linear motor which is accommodated in one of the telescopic parts.

In order to protect the suspension of the bearing arms and the drive elements relating to them against dirt and kicking movements of the animal, a push-on plate is provided, on one side of which plate the suspension of the bearing arms is situated, while the other side faces the animal to be milked.

Reference is also made to the device known from European Application 306579. In this known device each test cup can be manoeuvred by means of its own bearing arm.

However, this known device has the following disadvantages. Some bearing arms are situated in a space below the set-up place for the animal, which limits the potential uses. It is not simple everywhere to provide a recess in the shed floor, which also has to be protected well from dirt. A further disadvantage is the articulated structure of the bearing arms. Such as articulated structure has a relatively low rigidity, in view of the different pivot points in each bearing arm. The fairly great arm length also makes it difficult to ensure the rigidity necessary for accurate positioning of the teat cups.

The invention will be explained in greater detail below with reference to a number of examples of embodiments.

BRIEF DESCRIPTION OF THE DRAWINGS

FIG. 3 shows a partially cut away top view of a second embodiment of the device according to the invention.

FIG. 4 shows a partially cut away side view of the device according to FIG. 3.

DESCRIPTION OF THE PREFERRED EMBODIMENT

Figure 1:
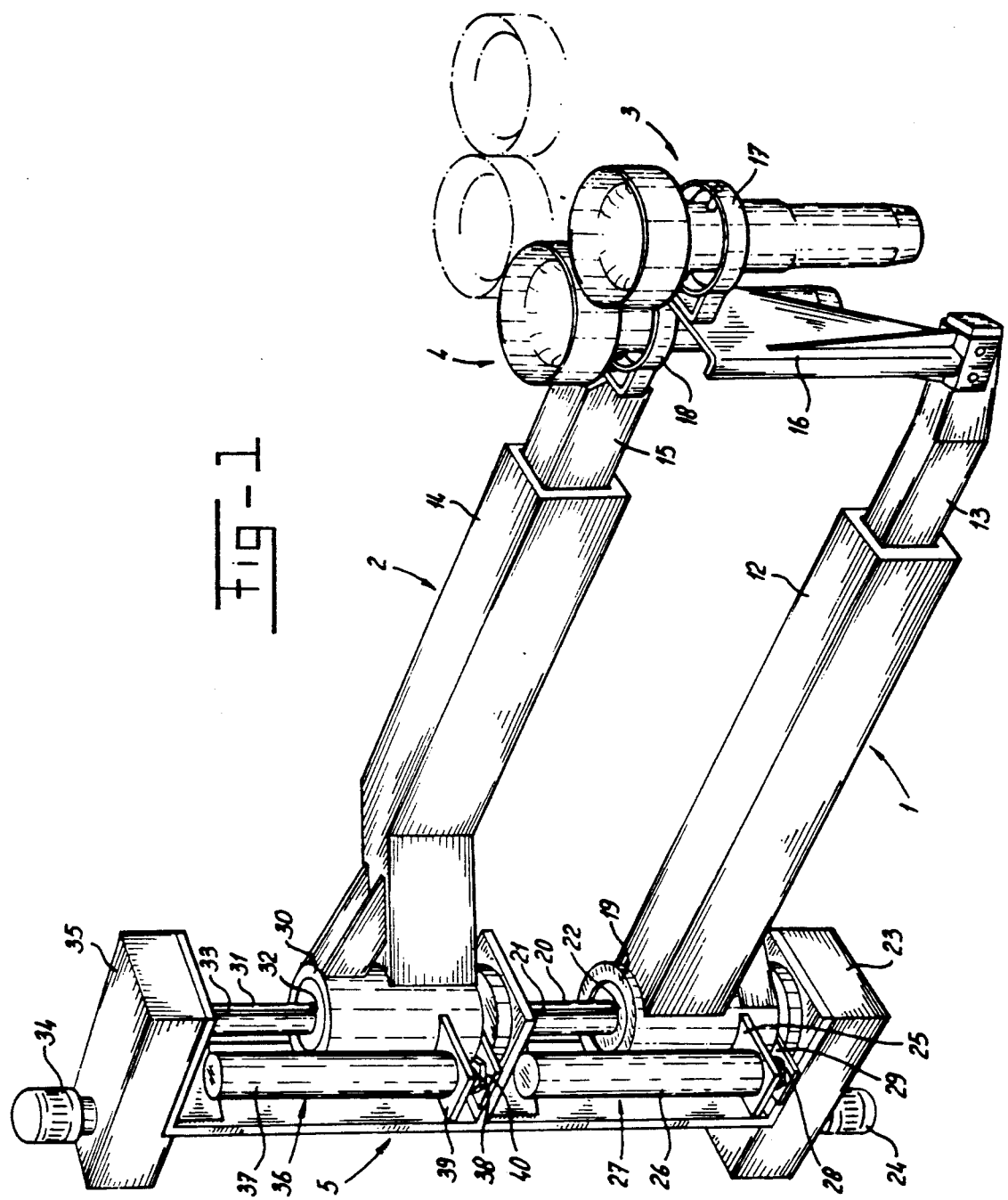
FIG. 1 shows a partial view in perspective of a first embodiment of the device according to the invention.

FIG. 1 shows two bearing arms, i.e. the lower bearing arm 1 and the upper bearing arm 2, bearing the teat cups 3, 4 respectively for the right teats of an animal to be milked. These bearing arms 1, 2 are supported in a sub-frame, indicated in its entirety by 5. This sub-frame forms a part of the overall frame 6, which also contains a sub-frame 7 for supporting the bearing arms 8, 9 with teat cups 10, 11 for the left teats of the animal. Since these bearing arms are mirror symmetrically identical, i.e. arm 1 is identical to arm 8, and arm 2 is identical to arm 9, attention will be focused on arms 1 and 2 below, but the description thereof also applies directly to arms 8 and 9.

The bearing arm 1 comprises telescopic parts 12, 13, and the bearing arm 2 comprises telescopic parts 14, 15. The telescopic parts thown possess a square cross-section. However, other cross-sectional shapes are also possible, e.g. round or elliptical. Fitted at the end of the outer telescopic part 13 is a support 16, to which the universal bearing ring 17 for teat cup 3 is fixed. The universal ring 18 for the teat cup 4 is fixed at the end of the outer telescopic part 15.

The inner telescopic part 12 is connected to a slide bush 19, which slides up and down about shaft 20. Shaft 20 has one or more key ways 21 (one is shown, but there can be three, for example). A key 22, fixed to the bush 19, projects into the key way or each key way 21. Bush 19 thus cannot rotate relative to shaft 20.

The shaft 20 is connected to a drive motor 24 by means of a transmission (not shown), for example a set of gear wheels, situated in housing 23. Shaft 20 can be rotated, preferably through at least 9°, by means of this drive motor 24. This rotation of the shaft 20 is accompanied by a horizontal movement in the transverse direction of the corresponding teat cup 3.

Fixed to the bush 19 is a bracket 25, to which the housing 26 of a piston-cylinder unit, indicated in its entirety by 27, is fixed. The piston rod 28 thereof is fixed to bracket 29, which is in turn fixed to shaft 20. A vertical movement of the bearing arm 1, and thus of the corresponding teat cup 3, can be produced by means of this piston-cylinder unit 27.

Finally, a drive (not visible in this figure) is accommodated in the drive arm 1 for sliding the outer telescopic part 13 in the lengthwise direction relative to the inner telescopic part 12. The milk pipes and the pneumatic lines connected to the teat cup 3 are not shown in any further detail. They can be guided away by means of the telescopic parts 12, 13. They can be accommodated in these parts, but they can also be guided along the outside thereof.

The drive for the upper bearing arm 2 is identical to that of the lower bearing arm 1. It also has a bush 30, shaft 31, key 32 connected to the bush 30, and a key way 33 interacting with said key 32 in shaft 31. The rotary drive of shaft 30 is by means of drive motor 34 and transmission 35. The vertical movement of the bearing arm 2 is supplied by the piston-cylinder unit 36, comprising a cylinder 37 and piston rod 38. They are fixed to bracket 39, 40 respectively.

Figure 2:
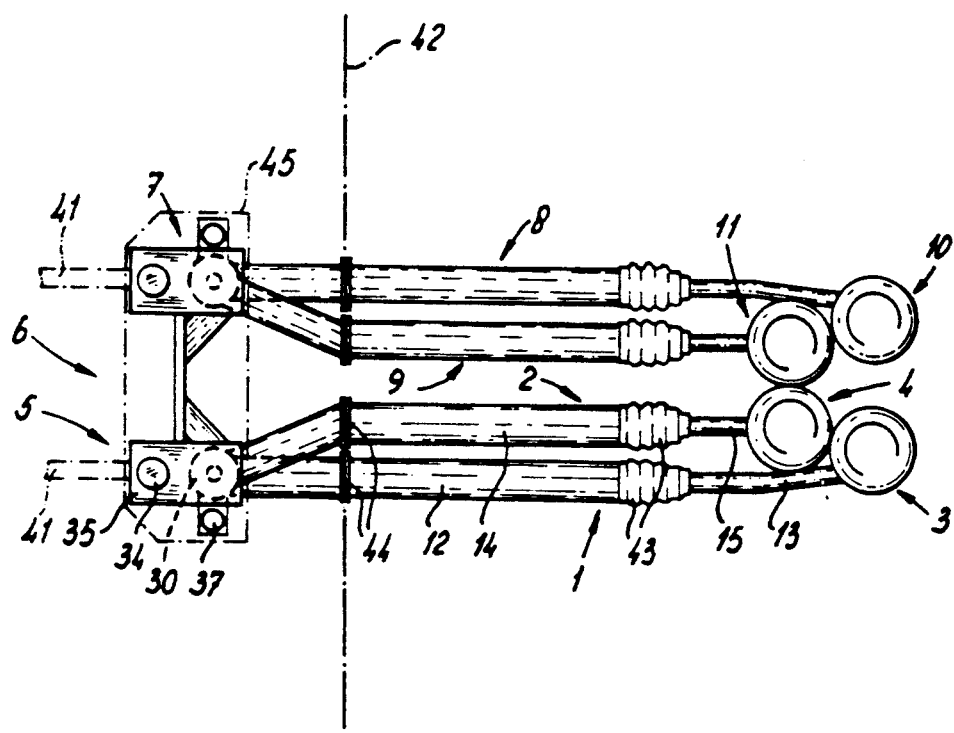
FIG. 2 shows a top view.

In the top view shown in FIG. 2 it can be seen clearly that the whole device is suspended from two bars 41, fixed securely to the overall Frame 6. These bars 41 are in turn fastened to a positioning mechanism (not shown), by means of which the whole unit according to the invention can be inserted from behind between the hind legs of an animal to be milked, and can be removed again in the reverse direction (see EP-B-167,555). Said bars can be hollow and can accommodate pipes or lines if desired.

It can also be seen in this figure that the device is essentially symmetrical relative to the central longitudinal plane determined by the bar 6.

The dashed and dotted line 42 shows schematically the position of a push-on plate, the purpose of which push-on plate 42 is to protect the suspension and control mechanisms of the device from soiling.

An elastic coupling in each bearing arm is indicated schematically by 44 in FIG. 2. It can be of known design and yield elastically, for example by means of bolts with springs under the bolt heads, which bolts connect two flanges as shown, for absorbing kicks by the cow.

The part of the device lying under the animal is much less susceptible to soiling. In particular, the parts 12, 13 and 14, 15 which are telescopic relative to each other are provided with rubber bellows 43 for that purpose, in such a way that the telescopic parts also are not susceptible to soiling.

Instead of or in addition to the plate 42, for protection of the drive unit, a cabinet 45 (dashed and dotted lines in FIG. 2) can be fitted around the frames 5 and 7, securely fixed to the bars 41 and with openings on the right side in FIG. 2, which permit movement of the bearing arms 1, 2, 8, 9. Rubber bellows between the edges of the openings and the bearing arms, comparable with the bellows 43, can protect these openings from the penetration of dirt.

In the second embodiment of the device according to the invention shown in FIGS. 3 and 4, four arms are also used, one for each teat cup. The arms 51 and 52 bear the teat cups 3 and 4 respectively for the right teats of an animal to be milked. The arms 53 and 54 bear the teat cups 10 and 11 respectively for the left teats. As can be seen in FIG. 4, arm 51 (and similarly arm 53) is at a lower level than arm 52 (and similarly arm 54).

Unlike the first embodiment, the arms 51 to 54 do not rotate, but are adjustable only parallel to themselves in the vertical direction. For this purpose, each arm is suspended from three vertically running guide bars 55, which are not in line with one another. In the top view of FIG. 3 it can be seen that these bars 55 lie on the corner points of an equilateral triangle. Fixed on the arms 51 to 54 is a housing 56, in which three guide bushes 57, one for each guide bar 55, are fixed together to the arm in question.

A bearing arm is adjustable in the vertical direction by means of a drive unit fitted halfway between the guide bars. This drive unit comprises a tubular cylinder 58, in which a piston is accommodated in a known manner not shown. This piston can be moved up and down through the cylinder 58 by means of pneumatic connections 77, 78. The piston is provided with magnets and consequently during its movements can take with it a sleeve 59 provided with magnets which is fitted externally around the cylinder 58 and is fastened to the arm.

The arms 51 to 54 are also telescopic. The telescopic part 60 of each arm is slidably guided here relative to the fixed part 61 by means of a roller 62, fixed to part 61. The fixed part also contains two guide bars 63, while two bushes 64 are fixed to the telescopic part 60. These bushes are slidable over the guide bars 63.

By analogy with the vertical adjustment of the arm, a cylinder 65 in the form of a tube is disposed in the fixed part 61, and contains a piston (not shown) with magnetic material. This piston can be moved to and fro by means of the pneumatic connections 66, 67. Fitted concentrically around the cylinder 65 is a sleeve 68 with magnetised material, which is also fixed to the telescopic part 60. When the piston is displaced through the cylinder 65, the sleeve 68 is carried along, and the horizontal position of the teat cup in question can be changed.

Each teat cup 4, 11 is suspended from an auxiliary arm 69, while each teat cup 3, 10 is suspended from an auxiliary arm 70 with an upward projecting support 71, in such a way that the teat cups 3, 10 are at the same nominal level as the teat cups 4, 11.

Each arm 69, 70 has a bolt connection 72, which can break when the stresses are too high, for example if an animal to be milked kicks the unit.

The arms 69, 70 are each suspended hingedly about a vertical hinge pin 73 from the telescopic part 60 of the supporting arm in question. A cogged quadrant 74, which meshes with rack 75, is fastened to said hinge pin 73. Rack 75 can be moved to and fro in its lengthwise direction by means of pneumatic piston-cylinder unit 76, which is supplied by pneumatic lines which are not shown.

During the to and fro movement of the rack 75 the teat cup in question is swung to and fro in the transverse direction.

Through suitable vertical movement of the appropriate supporting arm, movement of the telescopic parts relative to each other, and swinging of the appropriate auxiliary arm, each teat cup can thus be moved into the desired position relative to a teat.

As already mentioned, the design with breaking bolts 74 provides a safety mechanism here against overloading. A further safety mechanism against excessive stresses arises from the use of the pistons with magnetic material and the magnetised sleeves interacting therewith. As noon as too great a horizontal force is exerted on a telescopic arm, the magnetised sleeve can slide relative to the magnetic cylinder, in such a way that overloading is avoided. The same applies to stresses in the vertical direction, with the result that good protection of the entire unit from, for example, kicking by the animal to be milked is obtained.

I claim:

1. A device for fitting a cluster of teat cups on animals comprising:

(a) a corresponding set of generally horizontal bearing arms, each of said bearing arms having a teat cup provided at the end thereof;
   (b) a supporting structure from which said bearing arms are suspended, said supporting structure adapted to place said bearing arms and said teat cups between the hind legs of an animal to be milked and remove said bearing arms and said teat cups therefrom and
   (c) drive means for moving each bearing arm in such a way that the corresponding teat cup can be fitted on a teat, each bearing arm being movable vertically relative to the supporting structure independently of the other bearing arms.

2. Device according to claim 1 wherein said bearing arms extend in the same general direction from said supporting structure, said bearing arms being of such a length that in the position in which the teat cups are fitted on the teats the supporting structure lies generally completely behind the hind legs of the animal.

3. Device according to claim 2 wherein each bearing arm is slidable along a generally vertical guide.

4. Device according to claim 3 wherein the guides of every two bearing arms lie in line with each other.

5. Device according to claim 4 wherein the guides of each pair of bearing arms with teat cups intended for fitting on the left or right teats of the animal lie in one line.

6. Device according to claim 5 wherein the bearing arm of each pair with the teat cup intended for a front teat of the animal is situated at a lower level than the other bearing arm of that particular pair.

7. Device according to claim 6 wherein an upright support is provided at the end of each bearing arm at a lower level facing away from the guide in order to support the corresponding teat cup at essentially the level of the other arm of said pair of bearing arms.

8. Device according to claim 7 wherein each supporting arm has a slide piece which is slidable in the lengthwise direction along the guide, said slide piece being non-rotatable relative to said guide.

9. Device according to claim 8, wherein each of said guides is made in the form of a vertical rotary shaft.

10. Device according to claim 9 wherein a rotary drive is connected to the bottom end of each rotary shaft for moving a bearing arm at a lower level, and to the top end of each rotary shaft for moving each bearing arm at a higher level.

11. Device according to claim 10 wherein the range of rotation of each bearing arm is at least 9°.

12. Device according to claim 11 wherein each guide has a transverse support onto which is connected one of a housing and a piston rod of a piston cylinder unit.

13. Device according to claim 8 wherein the guides are fixed, and each bearing arm at its end away from the supporting structure has an auxiliary arm which at one side is fixed to said bearing arm so that it pivots about a generally vertical axis and which at the other side bears a teat cup.

14. Device according to claim 13 wherein the arm is connected to a cogged quadrant which meshes with a rack which is slidable in the lengthwise direction of the arm, said rack being drivable by means of a linear motor fixed to the arm.

15. Device according to claim 14 wherein each auxiliary arm provided with a breaking bolt.

16. Device according to claim 1 wherein each bearing arm has a coupling which yields under extreme loading.

17. Device according to claim 1 wherein the bearing arms comprise telescopic parts which are displaceable relative to each other by means of a linear motor which is accommodated in one of the telescopic parts.

18. Device according to claim 12 wherein one of the telescopic parts comprises two parallel and generally horizontal guide rods, along which guide rods a sliding block is slidable, said sliding block being connected to the other telescopic part, and the said one telescopic part also carries a roller over which the other telescopic part rolls.

19. Device according to claim 18 wherein each bearing arm is slidable along a generally vertical guide, each vertical guide comprising three parallel generally vertical guide rods which are not coplanar, wherein a sliding block, connected to the bearing arm, is slidable along said guide rods by means of the linear motor.

20. Device according to claim 19 wherein the linear motor comprises a pneumatic cylinder with magnetic piston and a bush provided on the outside of the cylinder, said bush containing magnetizable material, said bush being taken along with the magnetic piston in such a way that one of the telescopic parts which are relatively movable is connected to the piston and the other to the bush.

21. Device according to claim 1 further comprising a ring fixed on each supporting arm in such a way that the plane determined by the ring is horizontal wherein a teat cup is suspended in each of said rings in such a way that said rings can rotate about two axes which lie in or are parallel to said plane.

22. Device according to claim 1 wherein a push-on plate is provided, wherein on one side of the plate the suspension of the bearing arms is situated and the other side faces the animal to be milked.

23. Device according to claim 1 wherein pneumatic lines and the milk discharge pipe are guided from the teat cups by the bearing arms.

* * * * *